(12) United States Patent
Lin et al.

(10) Patent No.: US 11,579,255 B2
(45) Date of Patent: Feb. 14, 2023

(54) EMITTER DEVICE FOR AN OPTICAL DETECTION APPARATUS, OPTICAL DETECTION APPARATUS, MOTOR VEHICLE AND METHOD

(71) Applicant: Valeo Schalter und Sensoren GmbH, Bietigheim-Bissingen (DE)

(72) Inventors: Lin Lin, Bietigheim-Bissingen (DE); Peter Horvath, Bietigheim-Bissingen (DE); Thomas Schuler, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 926 days.

(21) Appl. No.: 16/335,006

(22) PCT Filed: Sep. 19, 2017

(86) PCT No.: PCT/EP2017/073557
§ 371 (c)(1),
(2) Date: Mar. 20, 2019

(87) PCT Pub. No.: WO2018/054871
PCT Pub. Date: Mar. 29, 2018

(65) Prior Publication Data
US 2019/0265338 A1    Aug. 29, 2019

(30) Foreign Application Priority Data

Sep. 22, 2016   (DE) .................... 10 2016 117 852.7

(51) Int. Cl.
*G01S 7/481*    (2006.01)
*G01S 17/42*    (2006.01)
(Continued)

(52) U.S. Cl.
CPC ............ *G01S 7/4817* (2013.01); *G01S 17/42* (2013.01); *G01S 17/931* (2020.01); *G02B 5/10* (2013.01); *G02B 26/101* (2013.01)

(58) Field of Classification Search
CPC ...... G01S 7/4817; G01S 17/42; G01S 17/931; G02B 5/10; G01B 26/101
(Continued)

(56) References Cited

U.S. PATENT DOCUMENTS

2012/0249996 A1    10/2012    Tanaka et al.

FOREIGN PATENT DOCUMENTS

| CN | 102736075 A | 10/2012 |
| DE | 10 2012 102244 A1 | 10/2012 |

(Continued)

OTHER PUBLICATIONS

Enblish translation of description of DE 102012102244, 121 pages. (Year: 2022).*
(Continued)

*Primary Examiner* — Daniel L Murphy
(74) *Attorney, Agent, or Firm* — Osha Bergman Watanabe & Burton LLP (57) ABSTRACT

The invention relates to a emitter device (8) for an optical detection apparatus (3) of a motor vehicle (1), which is designed to scan a surrounding region (4) of the motor vehicle (1) by means of a light beam (10), and which comprises a light source (13) for emitting the light beam (10) and a deflection unit (15), wherein the deflection unit (15) is designed to deflect the light beam (10) emitted onto the deflection unit (15) by the light source (13) at different scanning angles (α), wherein the deflection unit (15) comprises a freeform mirror (19). The freeform mirror (19) comprises at least two surface elements (20a, 20b) having different angles of inclination (21a, 21b) and is designed to
(Continued)

reflect the light beam (10) in order to generate a predetermined setpoint field of view (16) of the emitter device (8) at predetermined setpoint values ($-\alpha 3$, $-\alpha 2$, $-\alpha 1$, $\alpha 0$, $+\alpha 1$, $+\alpha 2$, $+\alpha 3$) for the scanning angle ($\alpha$), said setpoint values corresponding to the angles of inclination (21a, 21b). The invention additionally relates to an optical detection apparatus (3), a motor vehicle (1) comprising at least one optical detection apparatus (3), and to a method for generating a setpoint field of view (16) for an emitter device (8) of an optical detection apparatus (3) of a motor vehicle (1).

15 Claims, 5 Drawing Sheets (51) Int. Cl.
G01S 17/93 (2020.01)
G02B 5/10 (2006.01)
G02B 26/10 (2006.01)
G01S 17/931 (2020.01)
(58) Field of Classification Search
USPC ......................................................... 356/4.01
See application file for complete search history.

(56) References Cited

FOREIGN PATENT DOCUMENTS

| DE | 10 2012 025281 A1 | 6/2014 |
| EP | 2921877 A2 | 9/2015 |
| EP | 2983030 A2 | 2/2016 |
| WO | 93/00602 A1 | 1/1993 |

OTHER PUBLICATIONS

English translation of description of EP 2983030, 28 pages. (Year: 2022).*

International Search Report and Written Opinion issued in corresponding International Patent Application No. PCT/EP2017/073557, dated Jan. 4, 2018 (14 pages).

Search Report issued in corresponding German Patent Application No. 10 2016 117 852.7, dated Jun. 2, 2017 (6 pages).

The First Office Action issued in corresponding Chinese Application No. 201780065328.3, dated Aug. 23, 2022 (28 pages).

* cited by examiner

EMITTER DEVICE FOR AN OPTICAL DETECTION APPARATUS, OPTICAL DETECTION APPARATUS, MOTOR VEHICLE AND METHOD

The invention relates to an emitter device for an optical detection apparatus of a motor vehicle, which is designed to scan a surrounding region of the motor vehicle by means of a light beam, and which comprises a light source for emitting the light beam and a deflection unit, wherein the deflection unit is designed to deflect the light beam emitted onto the deflection unit by the light source at different scanning angle alpha, into the surrounding region. The invention additionally relates to an optical detection apparatus for a motor vehicle, a motor vehicle comprising at least one such optical detection apparatus, and a method.

In the present case, there is interest in optical detection apparatuses for motor vehicles, in particular in laser scanners. It is known here to monitor a surrounding region of the motor vehicle by means of the optical detection apparatus. By means of the optical detection apparatus, objects in the surrounding region of the motor vehicle can be detected and information about the detected objects, for example a relative position of the objects with respect to the motor vehicle, can be provided to a driver assistance system of the motor vehicle. On the basis of this information, the driver assistance system can for example initiate measures to avoid a collision of the motor vehicle with the object, for example automatically brake the motor vehicle before the collision.

In laser scanners in accordance with the prior art, a light beam, for example a laser beam, is usually emitted into the surrounding region by an emitter device of the laser scanner, and the surrounding region is probed or scanned by varying a scanning angle or a scanning direction in which the laser beam is emitted. As soon as the light beam impinges on an object in the surrounding region, at least part of the light beam is reflected at the object back to the laser scanner. A receiver device of the laser scanner receives the reflected part of the light beam and determines a distance of the object with respect to the motor vehicle on the basis of a time of flight of the laser beam or a time duration between the emission of the light beam and the reception of the reflected part of the light beam. With knowledge of the scanning angle during emission of the light beam, it is additionally possible to determine an orientation or a direction of the object with respect to the motor vehicle. The relative position of the object with respect to the motor vehicle can then be determined from the orientation and the distance.

In order to vary the scanning angle, the light beam is usually deflected by a deflection unit of the emitter device. In this case, the deflection unit is generally configured as a rotatable or pivotable mirror, which reflects the light beam in the different scanning directions, wherein the scanning direction is set by way of a pivot angle or an orientation of the pivotable mirror. In this case, an angular range in the surrounding region within which the light beam is deflected into the surrounding region forms a field of view of the emitter device. Said field of view ought ideally to have a particularly large aperture angle and a specific setpoint shape. In order to increase the aperture angle, there is usually an angle between the light beam incident on the mirror and the light beam reflected by the mirror, that is to say the scanning direction. This can have the effect that an actual shape of the field of view deviates from the setpoint shape of the field of view, that is to say that the field of view of the emitter device is distorted. Although minor distortions can be compensated for by software by means of specific regions of the field of view not being used, the optical detection apparatus in accordance with the prior art has a low efficiency and high losses since these regions are nevertheless illuminated by the light beam.

It is an object of the present invention to provide a solution as to how an optical detection apparatus for a motor vehicle can be configured particularly efficiently and with low losses.

This object is achieved according to the invention by means of an emitter device, an optical detection apparatus, a motor vehicle and a method according to the respective independent patent claims. Advantageous embodiments of the invention are the subject matter of the dependent patent claims, the description and the figures.

In accordance with one embodiment of an emitter device according to the invention for an optical detection apparatus of a motor vehicle, this emitter device is designed to scan a surrounding region of the motor vehicle by means of a light beam. The emitter device can comprise a light source for emitting the light beam and a deflection unit, wherein the deflection unit is designed to deflect the light beam emitted onto the deflection unit by the light source at different scanning angles into the surrounding region. In particular, the deflection unit comprises a freeform mirror, wherein the freeform mirror comprises at least two surface elements having different angles of inclination and is designed to reflect the light beam in order to generate a predetermined setpoint field of view of the emitter device at predetermined setpoint values for the scanning angle, said setpoint values corresponding to the angles of inclination.

Preferably, an emitter device according to the invention for an optical detection apparatus of a motor vehicle is designed to scan a surrounding region of the motor vehicle by means of a light beam. The emitter device comprises a light source for emitting the light beam and a deflection unit, wherein the deflection unit is designed to deflect the light beam emitted onto the deflection unit by the light source at different scanning angles into the surrounding region. Furthermore, the deflection unit comprises a freeform mirror, wherein the freeform mirror comprises at least two surface elements having different angles of inclination. The freeform mirror is designed to reflect the light beam in order to generate a predetermined setpoint field of view of the emitter device at predetermined setpoint values for the scanning angle, said setpoint values corresponding to the angles of inclination.

By means of the optical detection apparatus, which is configured in particular as a Lidar system (Lidar-"Light Detection and Ranging") or as a laser scanner, the surrounding region of the motor vehicle can be monitored by the detection of objects or obstacles for the motor vehicle in the surrounding region. For this purpose, the optical detection apparatus comprises the emitter device comprising the light source for generating the light beam, in particular a laser beam. The light source, which for example comprises an emitter element in the form of a laser diode, can emit the laser beam at a specific angle of incidence onto the deflection unit, wherein the deflection unit deflects the light beam in order to provide a scanning movement or scan movement at the different scanning angles. This means that for the scanning of the surrounding region by the emitter device the light beam is deflected successively or sequentially in different scanning directions. In other words, this means that the scanning angle at which the light beam is emitted into the surrounding region is varied stepwise. During a first measurement or at a first measurement instant, the light beam is reflected in a first scanning direction, during a subsequent second measurement or at a second subsequent measurement instant, the light beam is reflected in a second scanning direction, etc. As a result of the reflection of the light beam at the different scanning angles, an angular range in the surrounding region of the motor vehicle is illuminated which forms the field of view of the emitter device, in particular the field of view of the optical detection apparatus. In this case, the scanning angle can be specified as an angle by which the scanning direction deviates, horizontally and/or vertically, from a predetermined direction, for example a longitudinal direction of the vehicle. By means of the deflection unit, the light beam can be deflected in particular horizontally and vertically, such that the surrounding region is scanned or swept over in a gridlike fashion, that is to say row by row or column by column.

In order then to generate the predetermined setpoint field of view having a predetermined setpoint shape, for the various scanning angle setpoint values, that is to say setpoint scanning angles, are predetermined. Preferably, a plane of the setpoint field of view generated by means of the setpoint values for the scanning angle perpendicular to a principal scanning direction of the emitter device is configured in a rectangular fashion. The setpoint field of view widens proceeding from the emitter device along the principal scanning direction and thus has a pyramidal shape. This means that all planes parallel to a base face of the pyramid are configured in a rectangular fashion. In order to provide the setpoint values for the scanning angle, the deflection unit comprises the freeform mirror. In this case, the freeform mirror is an optical element having a surface that is reflective or specularly reflective for the light beam, wherein the reflective surface is configured as a freeform surface. In this case, the freeform surface has the at least two surface element having different orientations or angles of inclination. In particular, the freeform surface is at least regionally curved. As a result of the different angles of inclination, for the same angle of incidence on the deflection unit the light beam is deflected in different scanning directions after the reflection.

The invention is based on the insight here that a planar, plane mirror surface, that is to say a surface which is not configured as a freeform surface having surface elements with different angles of inclination, can distort the field of view of the emitter device since the actual values of the scanning angle that are provided by the planar surface do not correspond to the setpoint values. Consequently, an actual shape of the field of view deviates from the setpoint shape. Such a distorted actual shape can be formed for example by a fan-shaped plane of the field of view perpendicular to the principal scanning direction. This distortion is prevented or compensated for by the freeform surface of the mirror, by the angles of inclination of the surface element being chosen such that the incident light beam is reflected at the respective setpoint scanning angle corresponding to the current measurement. In particular, for this purpose, a surface element for reflecting the light beam at the respective setpoint value for the scanning angle is assigned to each setpoint value for the scanning angle. This means that in order to generate a specific setpoint value for the scanning angle, that is to say in order to deflect the light beam in a predetermined setpoint scanning direction, the light beam is reflected at that surface element whose angle of inclination can result in the light beam being deflected in the corresponding setpoint scanning direction. To put it another way, in order to provide a specific setpoint scanning angle, the light beam emitted by the light source is reflected at the associated surface element.

The freeform surface can thus ensure that the illuminated angular range can be fully utilised and objects in this range can be certainly and reliably detected. By means of the emitter device, it is thus possible to realise a particularly efficient and low-loss optical detection apparatus for a motor vehicle.

In accordance with one embodiment of the invention, the freeform mirror is mounted in a pivotable fashion and is designed to reflect the light beam depending on a pivot angle of the freeform mirror and the angles of inclination of the surface elements at the predetermined setpoint values for the scanning angle. In accordance with this embodiment, the deflection unit comprises in particular only the freeform mirror mounted in a pivotable or rotatable fashion. In order to generate the scanning movement, the pivot angle of the freeform mirror is varied in particular stepwise, such that the light beam is reflected into the surrounding region at the setpoint scanning angle corresponding to the pivot angle and angle of inclination of the reflective surface element. In accordance with this embodiment, the predetermined setpoint value for the scanning angle can be provided with a particularly low outlay in respect of component parts.

In an alternative, preferred embodiment, the deflection unit comprises, in addition to the freeform mirror, a pivotable mirror designed to reflect the light beam emitted onto the pivotable mirror by the light source at actual values for the scanning angle, said actual values corresponding to pivot angles of the pivotable mirror, wherein the freeform mirror is designed, for the purpose of generating the setpoint field of view, to compensate for a deviation between the actual value provided by the pivotable mirror and the setpoint value for the scanning angle. In particular, the freeform mirror is arranged in a non-movable fashion in an optical path between the pivotable mirror and the surrounding region and is designed to deflect or reflect the light beam reflected onto the freeform mirror at the actual values for the scanning angle by the pivotable mirror at the predetermined setpoint values.

In accordance with this embodiment, the deflection unit thus comprises the pivotable mirror and the freeform mirror, wherein the light beam is firstly emitted onto the pivotable mirror by the light source at a specific angle of incidence. Said pivotable mirror reflects the light beam depending on the current pivot angle or on a current position of the pivotable mirror at specific actual values for the scanning angle. In this case, in particular starting from a specific magnitude of the setpoint values of the scanning angle, the actual value provided by the pivotable mirror can deviate from the setpoint value. With no compensation of this deviation, the result is an actual field of view of the emitter device that is distorted relative to the setpoint field of view. However, this distortion can advantageously be compensated for by means of the freeform mirror. In this case, the freeform mirror is installed in the emitter device fixedly or in a non-movable fashion, that is to say in a non-rotatable or non-pivotable fashion. The light beam is thus firstly emitted onto the pivotable mirror by the light source, said pivotable mirror reflecting the light beam onto the freeform mirror at different actual values for the scanning angle. The freeform mirror can vary a deflection of the light beam for those actual values of the scanning angle which deviate from the associated setpoint values. The emitter device is thus configured particularly simply since no alterations need be made to the basic construction of the emitter device comprising the light source and the pivotable mirror. The freeform mirror can thus be added to the emitter device rapidly and simply in order to compensate for the distortion of the field of view.

In this case, it can be provided that the pivotable mirror is configured as a micromirror actuator having a plane surface and a surface of the freeform mirror that is formed by the surface elements of the freeform mirror is configured such that it is at least regionally curved. The pivotable mirror configured as a micromirror actuator or MEMS mirror (MEMS—Microelectromechanical system) has the plane, planar specularly reflective surface. The freeform mirror, by contrast, has the curved surface, wherein a curvature of the surface is determined in such a way that it compensates for the deviation between the actual values provided by the MEMS mirror and the setpoint values for the scanning angle.

Preferably, the angles of inclination of the respective surface elements of the freeform mirror are predefined depending on the pivot angles of the pivotable mirror. The invention is based on the insight here that the distortion of the actual field of view with respect to the setpoint field of view is caused by the pivotable mirror, in particular by an angle between the direction of incidence of the light beam on the pivotable mirror and the scanning direction provided by the pivotable mirror. In this case, the direction of incidence is that direction in which the light source emits the light beam onto the pivotable mirror. In this case, an intensity of the distortion is dependent on the respective pivot angle of the pivotable mirror. Particularly at edges of the field of view which are generated by the maximum pivot angles of the pivotable mirror, distortions can occur which can be compensated for by means of the freeform mirror.

In particular, the pivotable mirror has a characteristic transfer function describing a distortion of an actual field of view generated by the pivotable mirror with respect to the setpoint field of view as a function of the pivot angles of the pivotable mirror. The angles of inclination of the surface elements of the freeform mirror are determined in such a way that the freeform mirror has an inverse of the characteristic transfer function. In this case, the distortion is determined on the basis of a deviation of shapes of planes of the actual field of view and of the setpoint field of view perpendicular to a principal scanning direction of the emitter device. In order to produce the freeform mirror for the emitter device, the angles of inclination of the surface elements are determined by firstly determining the transfer function of the pivotable mirror. For this purpose, by way of example, the non-compensated actual field of view generated by the pivotable mirror can be detected. To put it another way, the actual field of view of the emitter device whose deflection unit does not have the freeform mirror is determined. In particular, the shape of the plane of the actual field of view perpendicular to the principal scanning direction of the emitter device is determined in this case. The plane of the actual field of view is usually fan-shaped, whereas the plane of the setpoint field of view is rectangular. This relation or this relationship between the shape of the setpoint field of view and the shape of the actual field of view can be described by means of the transfer function, which in particular is dependent on the pivot angles of the pivotable mirror. In particular that function which converts the setpoint shape of the field of view into the actual shape of the field of view is thus determined as the transfer function. To put it another way, the setpoint shape of the field of view, to which the transfer function is applied, yields the actual shape of the field of view. With knowledge of the transfer function, a surface profile of the freeform mirror can be determined such that the transfer function is inverted by the freeform mirror arranged in the deflection unit and the distortion is thus compensated for. The actual shape of the field of view, to which the inverse transfer function is applied, thus yields the setpoint shape of the field of view. By means of the determination of the transfer function and the inverse transfer function, the freeform mirror can thus advantageously be ideally adapted to the pivotable mirror and the setpoint field of view can thus be generated.

It proves to be advantageous if the light source comprises at least two separately drivable emitter elements in order to provide the setpoint values for the scanning angle. The light source can comprise for example at least two emitter elements in the form of laser diodes or LEDs which are separably drivable. By way of example, for setpoint values of the scanning angle from a first value range, it is possible to drive a first of the emitter elements for emitting the light beam and, for setpoint values of the scanning angle for a second value range, it is possible to drive a second of the emitter elements for emitting the light beam. In this case, the emitter elements emit the light beam in different directions, wherein a first direction is assigned a first angle of incidence of the light beam on the pivotable mirror, and a second direction is assigned a second angle of incidence of the light beam on the pivotable mirror, etc. By means of the respective emitter element currently emitting, it is thus possible to influence the angle of incidence of the light beam on the pivotable mirror and hence to at least reduce a deviation between the setpoint value and the actual value of the scanning angle, said deviation being caused by the pivotable mirror, already during the emission of the light beam.

In particular, the light source in this case comprises a matrix arrangement of emitter elements, wherein for each scanning angle a specific number of emitter elements having a specific position in the matrix arrangement are driven for the emission of the light beam. A drive strategy for the emitter elements, which comprises the number and the position of the emitter elements, can be predetermined, for example, such that said drive strategy for the emitter elements of the light source likewise provides the inverse of the transfer function of the mirror mounted in a pivotable fashion. The driving of the emitter elements can be carried out for example by a control device of the optical detection apparatus.

Moreover, it can be provided that the emitter device for providing the setpoint values for the scanning angle additionally comprises a lens element having a freeform surface for transmitting the light beam deflected by the deflection unit into the surrounding region, wherein the lens element is designed to compensate for a deviation of the actual value generated by the deflection unit from the setpoint value for the scanning angle. This means that the emitter device additionally comprises the lens element having the freeform surface, that is to say a freeform lens, which is arranged in an optical path between the deflection unit and the surrounding region. This means that before emission into the surrounding region, the light beam reflected by the deflection unit passes through the lens element, which is optically transparent to the light beam reflected by the freeform mirror. In this case, the lens element likewise comprises a freeform surface, the surface elements of which have different angles of inclination and by which the deflection of the light beam, that is to say the scanning angle, can be set. The freeform lens, the surface of which is at least regionally curved, can alter the value of the scanning angle during transmission if the actual value does not correspond to the setpoint value for the scanning angle. This may occur for example if the deviation between the actual values and the setpoint values cannot be completely compensated for by the freeform mirror. By means of the freeform lens, the field of view of the emitter device can thus advantageously likewise be rectified.

The invention additionally relates to an optical detection apparatus, in particular a laser scanner, for a motor vehicle for monitoring a surrounding region of the motor vehicle, comprising an emitter device according to the invention or an embodiment of the emitter device according to the invention and also a receiver device. The receiver device is designed to receive a part of the light beam that has been reflected at an object in the surrounding region and to determine a distance between the object and the motor vehicle on the basis of a time duration between the emission of the light beam and the reception of the reflected part of the light beam.

A motor vehicle according to the invention comprises at least one optical detection apparatus. The motor vehicle is configured in particular as a car. The distance of the object, said distance being detected by the detection apparatus, can be provided for example to a control device of a driver assistance system of the motor vehicle, which enables at least semiautonomous driving of the motor vehicle, for example. The motor vehicle can be automatically braked by the control device, for example, if the detection device has detected that the distance between the object and the motor vehicle falls below a predetermined distance threshold value.

The invention additionally relates to a method for generating a setpoint field of view for an emitter device of an optical detection apparatus of a motor vehicle. In accordance with one embodiment of the method, a light source for emitting the light beam and a deflection unit are provided for the emitter device, wherein a light beam emitted onto the deflection unit by the light source can be deflected at different scanning angle by means of the deflection unit. In particular, a freeform mirror is provided for the deflection unit, wherein the freeform mirror is produced with at least two surface elements having different angles of inclination and, in order to generate the setpoint field of view of the emitter device, the light beam is reflected at predetermined setpoint values for the scanning angle, said setpoint values corresponding to the angles of inclination, into the surrounding region.

Preferably, the method involves providing for the emitter device a light source for emitting the light beam and a deflection unit, wherein a light beam emitted onto the deflection unit by the light source is deflected at different scanning angle by means of the deflection unit. Furthermore, a freeform mirror is provided for the deflection unit, wherein the freeform mirror is produced with at least two surface elements having different angles of inclination and, in order to generate the setpoint field of view of the emitter device, the light beam is reflected along predetermined setpoint values for the scanning angle, said setpoint values corresponding to the angles of inclination, into the surrounding region.

In particular, the emitter device is produced with a deflection unit comprising a pivotable mirror and the freeform mirror. Determining the angles of inclination of the surface elements involves determining a transfer function for the pivotable mirror, which describes a deviation of a shape of an actual field of view of the emitter device from a shape of the setpoint field of view. In this case, the angles of inclination of the surface elements of the freeform mirror are determined and produced such that an inverse of the transfer function is provided by the freeform mirror.

The preferred embodiments and their advantages presented with regard to the emitter device according to the invention are correspondingly applicable to the optical detection apparatus according to the invention, the motor vehicle according to the invention and to the method according to the invention.

Further features of the invention are evident from the claims, the figures and the description of the figures. The features and feature combinations mentioned above in the description and the features and feature combinations mentioned below in the description of the figures and/or shown in the figures alone are usable not only in the combination respectively indicated, but also in other combinations or by themselves, without departing from the scope of the invention. Consequently, the invention should be considered also to encompass and disclose embodiments which are not explicitly shown and explained in the figures, but emerge and are producible by way of separate feature combinations from the embodiments explained. Embodiments and feature combinations which therefore do not have all the features of an originally formulated independent claim should also be considered to be disclosed. Furthermore, in particular by virtue of the embodiments set out above, embodiments and feature combinations which go beyond or deviate from the feature combinations set out in the dependency references of the claims should be considered to be disclosed.

In the figures.

In the figures, identical and functionally identical elements are provided with the same reference signs.

Figure 1:
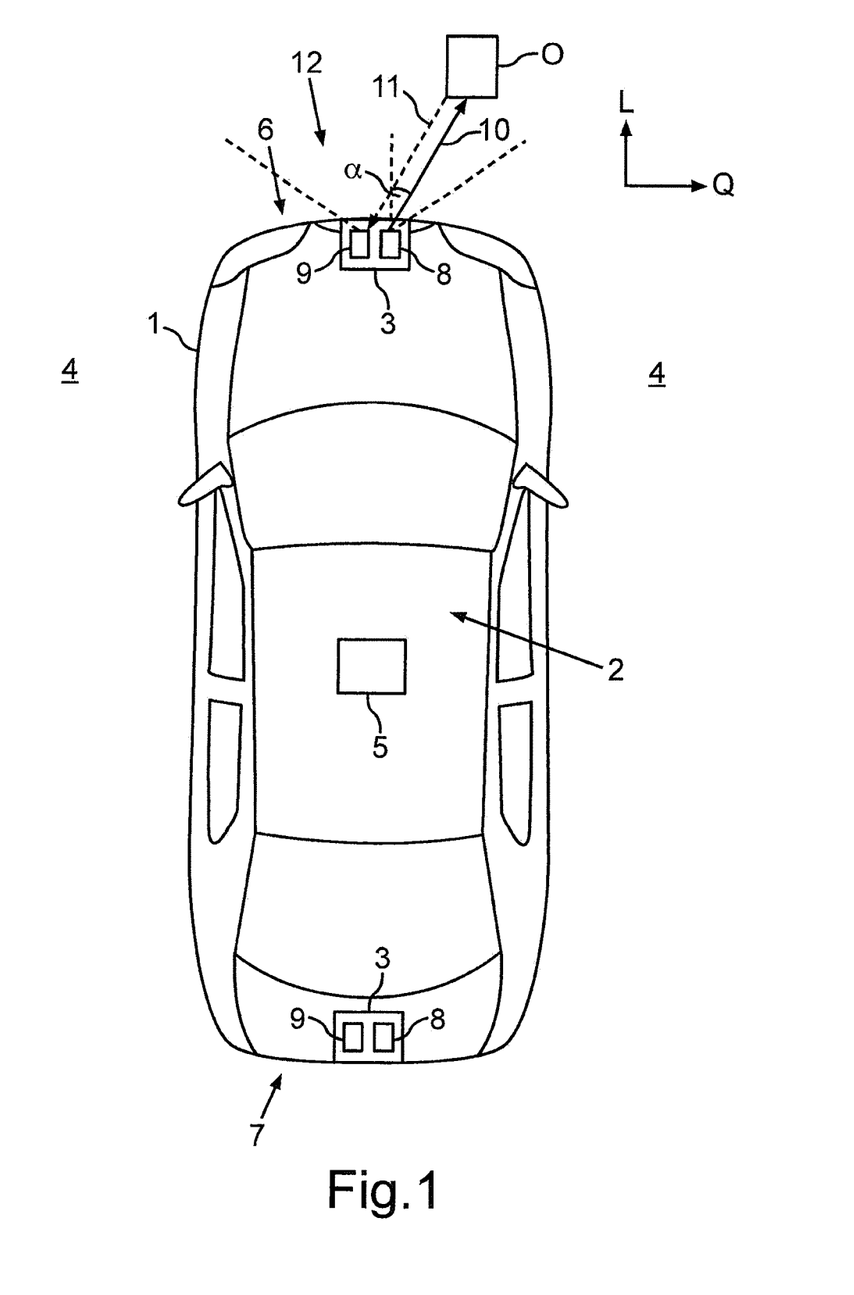
FIG. 1 shows a schematic illustration of one embodiment of a motor vehicle according to the invention.

FIG. 1 shows a motor vehicle 1 according to the present invention. In the present case, the motor vehicle 1 is configured as a car. The motor vehicle 1 comprises a driver assistance system 2 designed to assist a driver of the motor vehicle 1 in driving the motor vehicle 1. The driver assistance system 2 comprises at least one optical detection apparatus 3 designed to monitor a surrounding region 4 of the motor vehicle 1. In particular, by means of the detection apparatus 3, a distance and an orientation of an object O in the surrounding region 4 of the motor vehicle 1 can be detected and provided for example to a control device 5 of the driver assistance system 2. The control device 5 can automatically brake the motor vehicle 1 for collision avoidance, for example, if the distance of the object O falls below a predetermined threshold value. In the present case, the driver assistance system 2 comprises two detection apparatuses 3, wherein a first detection apparatus 3 is arranged in a front region 6 of the motor vehicle 1 and serves to monitor the surrounding region 4 in front of the motor vehicle 1, and a second detection apparatus 3 is arranged in a rear region 7 of the motor vehicle 1 and serves to monitor the surrounding region 4 behind the motor vehicle 1. Further detection apparatuses 3 can also be provided, for example in side regions of the motor vehicle 1.

In the present case, the optical detection apparatus 3 is configured as a laser scanner and comprises an emitter device 8 and also a receiver device 9. The emitter device 8 emits a light beam 10 into the surrounding region 4 and the receiver device 9 receives a part 11 of the light beam 10 that is reflected at the object O. The receiver device 9 can detect the distance of the object O on the basis of a time of flight between the emission of the light beam 10 and the reception of the reflected part 11 of the light beam 10. In this, the light beam 10 is deflected successively or stepwise at different scanning angles α. As a result, the surrounding region 4 is scanned in a gridlike fashion by means of the light beam 10. FIG. 1 shows horizontal components of the scanning angle α in a horizontal plane spanned by a longitudinal direction L of the vehicle and a transverse direction Q of the vehicle. The horizontal component of the scanning angle α and a vertical component (not shown here) of the scanning angle α in a plane spanned by the longitudinal direction L of the vehicle and a vertical direction of the vehicle are known to the emitter device 8, as a result of which an orientation or direction of the object O relative to the motor vehicle 1 is also known. An angular range 12 in the surrounding region 4 which is illuminated by means of the light beam 10 oriented in different scanning directions forms a field of view of the emitter device 8.

Figure 2:
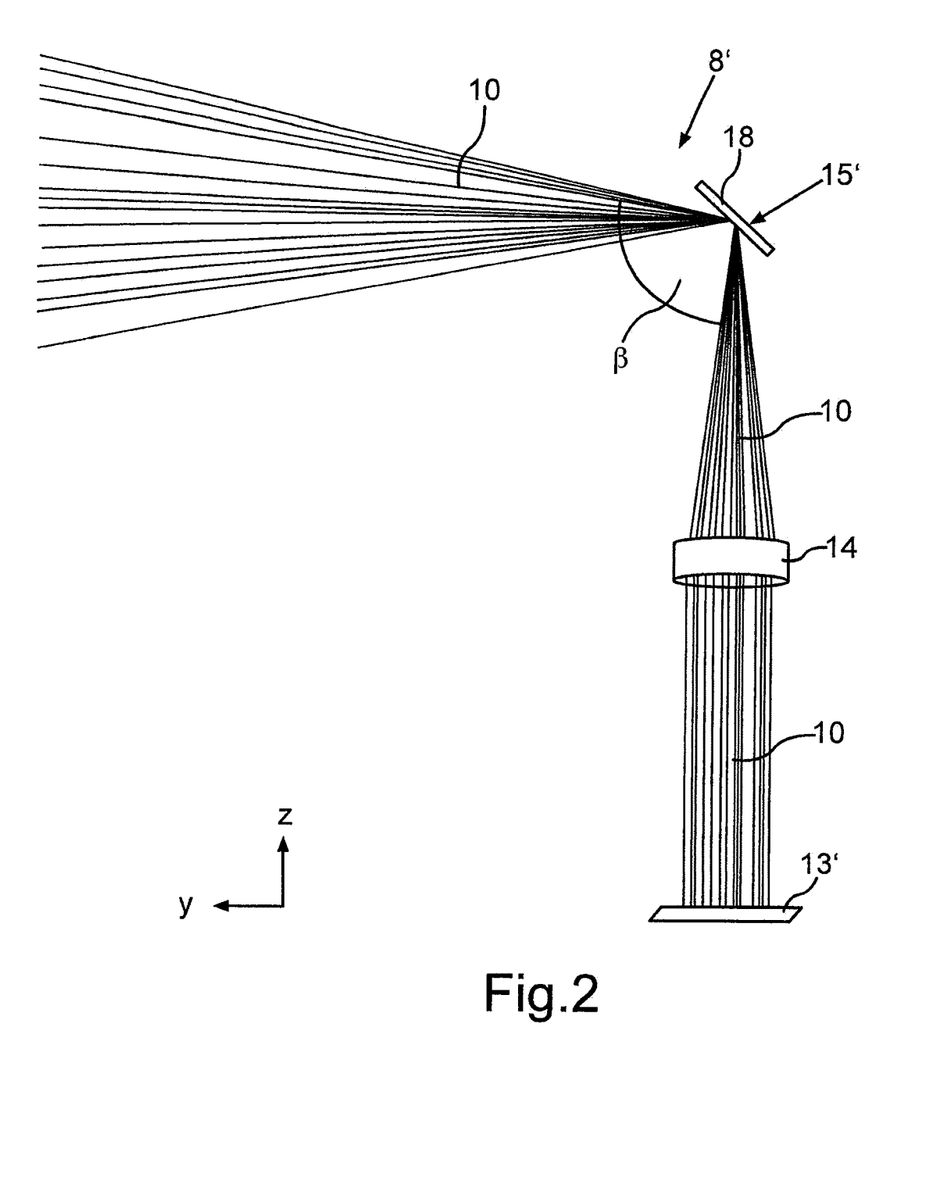
FIG. 2 shows a schematic illustration of an emitter device of an optical detection apparatus in accordance with the prior art.

FIG. 2 shows an emitter device 8' in accordance with the prior art. The emitter device 8' comprises a light source 13' designed to emit the light beam 10. Moreover, the emitter device 8' comprises a collimator 14, which focuses the light beam 10. The focused light beam 10 is emitted onto a deflection unit 15' consisting of a pivotable mirror 18, which is configured here as a micromirror actuator or MEMS mirror. The pivotable mirror 18 serves to reflect the light beam 10 at the different scanning angles α into the surrounding region 4. In order to generate the field of view having a particularly large aperture angle, for example 150° C., there is an angle difference β between a direction of incidence of the light beam 10, which here is oriented along the z-direction, and the scanning direction, which here is oriented along the y-direction: the angle β here is 90°, for example.

Figure 3:
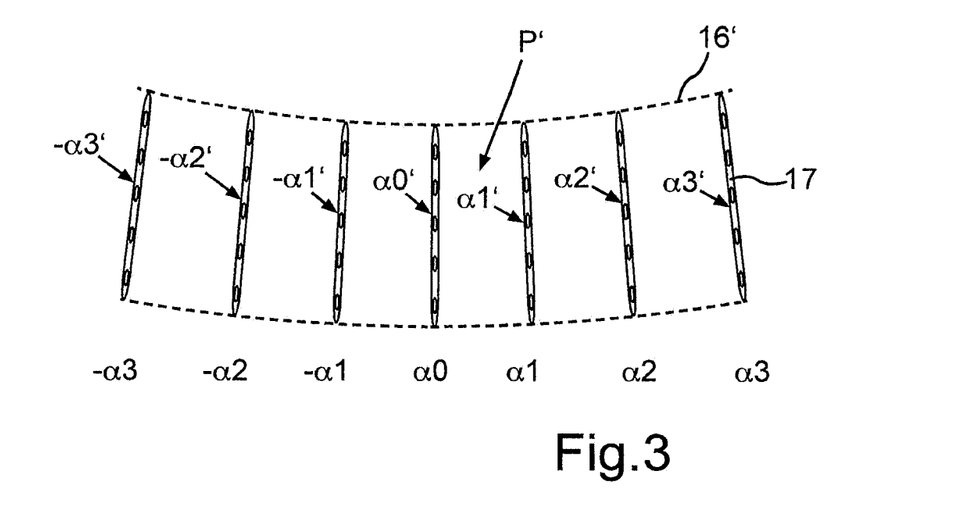
FIG. 3 shows a schematic illustration of an actual field of view of the emitter device in accordance with FIG. 2.

The emitter device 8' in accordance with the prior art results in an actual field of view 16', which is shown in FIG. 3. The actual field of view 16' has an actual shape P' and is configured in a fan-shaped fashion in the present case. FIG. 3 here shows illumination strips 17 for various setpoint values −α3, −α2, −α1, α0, +α1, +α2, +α3 of the scanning angle α. Each illumination stripe 17 characterizes an actual value −α3', −α2', −α1', α0', +α1', +α2', +α3' of the scanning angle α and corresponds to a column illuminated by the light beam 10 on a target surface (target) at a respective measurement instant, wherein each measurement instant is assigned a setpoint value −α3 to +α3 for the scanning angle α at which the light beam 10 is intended to be emitted at said measurement instant. Ideally, that is to say if the actual values −α3' to +α3' provided by the deflection unit 15 actually correspond to the setpoint values −α3 to +α3, the illumination stripes 17 are oriented vertically, thus forming a setpoint field of view 16 having a rectangular setpoint shape P (see FIG. 4). However, it is evident that in particular the outer illumination stripes 17 at the scanning angles −α3 and +α3, which form edges of the field of view 16', are not oriented vertically, with the result that the fan-shaped actual field of view 16' is distorted relative to the setpoint field of view 16. The distortion of the field of view 16' thus also increases as the scanning angle α increases.

Figure 4:
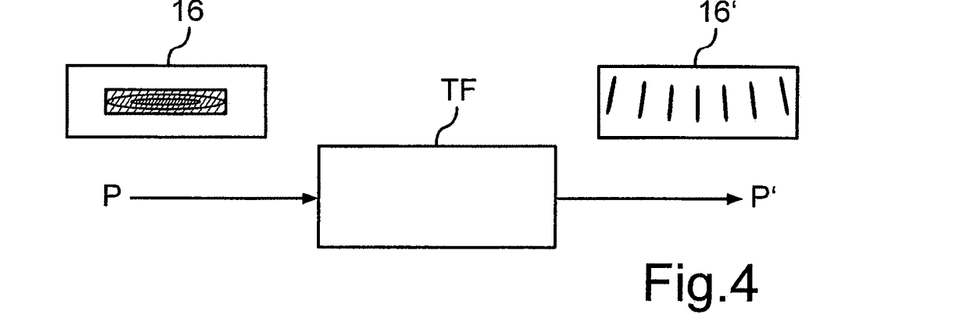
FIG. 4 shows a schematic illustration of a relationship between the actual field of view in accordance with FIG. 3 and a setpoint field of view.

FIG. 4 shows a relationship between the setpoint shape P of the setpoint field of view 16 and the actual shape P' of the actual field of view 16'. In this case, the actual shape P' of the actual field of view 16' is coupled to the setpoint shape P of the setpoint field of view 16 by way of a transfer function TF in accordance with the formula P*TF=P'. In this case, the transfer function TF describes the distortion of the actual field of view 16' relative to the setpoint field of view 16 or the deviation of the actual values −α3' to +α3' of the scanning angle α from the setpoint values −α3 to +α3 of the scanning angle α, which deviation is caused by the pivotable mirror 18.

Figure 5:
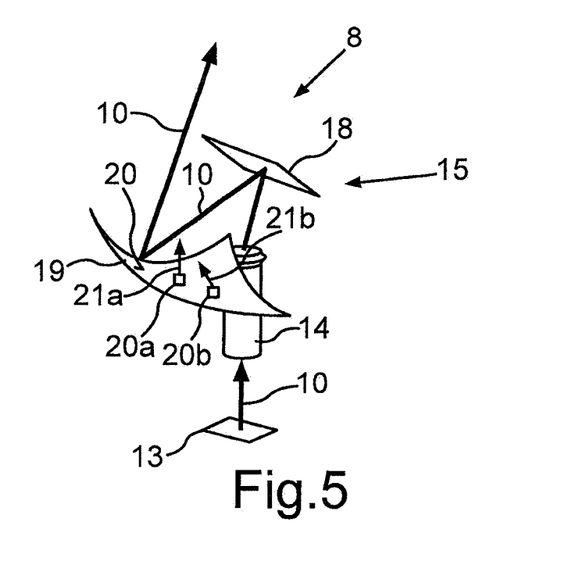
FIG. 5 shows a schematic illustration of an emitter device in accordance with one embodiment of an optical detection apparatus according to the invention.

In order then to convert the actual field of view 16' into the setpoint field of view 16, an inverse transfer function RTF is determined, such that the formula P*(TF*RTF)=P or P'*RTF=P holds true. In order to provide the inverse transfer function RTF, an emitter device 8 such as is shown in FIG. 5 is provided for the optical detection apparatus 13. The emitter device 8 here comprises, besides a light source 13, which comprises for example at least one emitter element in the form of a laser diode, and besides the collimator 14, a deflection unit 15, which in the present case comprises a freeform mirror 19 besides the pivotable mirror 18. The light beam 10 generated by the light source 13 is firstly emitted onto the pivotable mirror 18, which reflects the light beam 10 onto a specularly reflective surface 20 of the freeform mirror 19. The freeform mirror 19 is designed to reflect the light beam 10 into the surrounding region 4 in such a way that the setpoint field of view 16 having the setpoint shape P results. The surface 20 of the freeform mirror 19 facing the pivotable mirror 18 is concavely curved here. In the case of the freeform mirror 19, therefore, surface elements 20a, 20b have different angles of inclination 21a, 21b. In this case, each angle of inclination 21a, 21b is assigned a setpoint values −α3 to +α3 for the scanning angle α, such that the respective surface element 20a, 20b reflects the light beam 10 at the assigned setpoint values −α3 to +α3 for the scanning angle α and thus compensates for the deviation between the actual values −α3' to +α3' of the scanning angle α and the setpoint values −α3 to +α3 of the scanning angle α. Said freeform mirror 19 has the inverse transfer function RTF. To put it another way, the inverse transfer function RTF is realized by means of the angles of inclination 21a, 21b of the surface elements 20a, 20b of the freeform mirror 19. The angles of inclination 21a, 21b of the surface elements 20a, 20b are determined as a function of the pivot angles of the pivotable mirror 18 and thus as a function of the respective setpoint values −α3 to +α3 of the scanning angle α that are to be provided.

Figure 6:
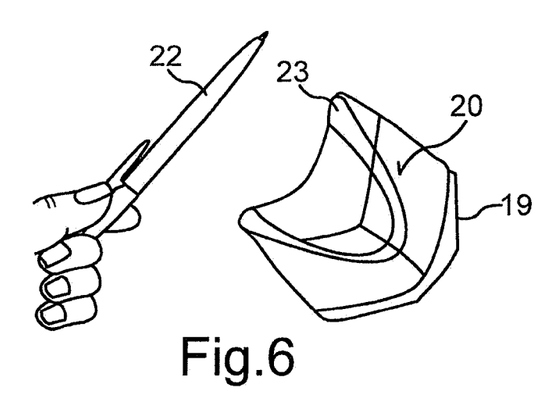
FIG. 6 shows a schematic illustration of a freeform mirror.

FIG. 6 shows by way of example how the specularly reflective surface 20 of a freeform mirror 19 images an object, for example a pen 22. An imaging 23 of the pen 22 on the surface 20 of the freeform mirror 19 is distorted since light incident on the surface 20 of the freeform mirror 19 is reflected in different directions on account of the curvature of the surface 20.

Figure 7:
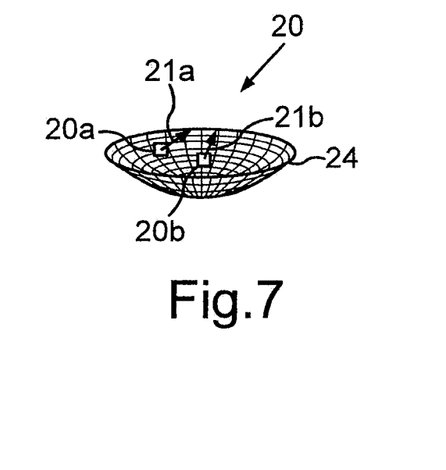
FIG. 7 shows a schematic illustration of a surface profile of a freeform mirror.
Figure 8:
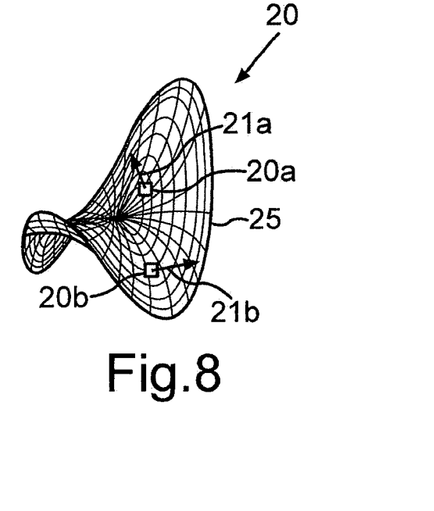
FIG. 8 shows a schematic illustration of a further surface profile of a freeform mirror.

FIG. 7 and FIG. 8 show different surface profiles 24, 25 of the specularly reflective surface 20 of the freeform mirror 19. The surface profile 24 in accordance with FIG. 7 is shaped for example in accordance with a surface of a segment of a sphere. The surface profile 25 in accordance with FIG. 8 has regions having different curvature signs, that is to say regions having positive curvature and regions having negative curvature. The surface profile 25 here has an approximately saddle-shaped form.

In this case, following the determination of the transfer function TF, the surface 20 is determined such that the inverse transfer function RTF is realized by the surface profile 24, 25 of said surface. Consequently, an emitter device 8 whose field of view 16 has the rectangular setpoint shape P can be realized by means of the freeform mirror 19.

Figure 9:
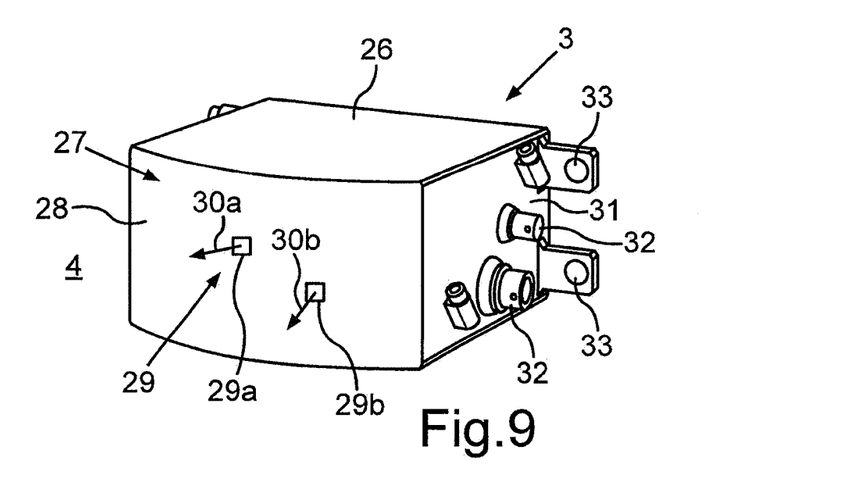
FIG. 9 shows a schematic illustration of one embodiment of an optical detection apparatus according to the invention.

FIG. 9 shows one embodiment of the optical detection apparatus 3 configured as a laser scanner. The optical detection apparatus 3 comprises a housing 26 surrounding the emitter device 8 and the receiver device 9. A front side 27 of the housing 25, said front side facing the surrounding region 4 in the state in which the optical detection apparatus 3 is installed on the motor vehicle 1, here has a lens element 28 having a freeform surface 29. Surface elements 29a, 29b of the freeform surface 29 of the lens element 28 here have different angles of inclination 30a, 30b. In this case, each angle of inclination 30a, 30b can likewise be assigned a setpoint value $-\alpha 3$ to $+\alpha 3$ for the scanning angle $\alpha$, such that the respective surface element 30a, 30b transmits the light beam 10 reflected by the deflection unit 15 into the surrounding region 4 in such a way that a deviation—not completely compensated for by the freeform mirror 19—between the actual values $-\alpha 3'$ to $+\alpha 3$ and the setpoint values $-\alpha 3$ to $+\alpha 3$ for the scanning angle $\alpha$ is in particular completely compensated for during transmission. The angles of inclination 30a, 30b of the surface elements 29a, 29b are for example likewise determined as a function of the pivot angles of the pivotable mirror 18 and thus as a function of the respective setpoint values $-\alpha 3$ to $+\alpha 3$ of the scanning angle $\alpha$ that are to be provided.

The light beam 10 here is thus transmitted from the emitter device 8, which is arranged in an interior of the housing 26, through the freeform lens 28 into the surrounding region 4 and the part 11 of the light beam 10 that is reflected in the surrounding region 4 is transmitted from the surrounding region 4 to the receiver device 9 arranged in the interior of the housing 26. The housing 26 here additionally has, in a side region 31, electrical connection elements 32 and securing elements 33 for securing the optical detection apparatus 3 to the motor vehicle 1.

The invention claimed is:

1. An emitter device for an optical detection apparatus of a motor vehicle configured to scan a surrounding region of the motor vehicle by a light beam, the emitter device comprising:
a light source for emitting the light beam; and
a deflection unit configured to deflect the light beam emitted onto the deflection unit by the light source at different scanning angles,
wherein the deflection unit comprises a freeform mirror, wherein the freeform mirror comprises at least two surface elements having different angles of inclination and reflects the light beam to generate a predetermined setpoint field of view of the emitter device at predetermined setpoint values for the scanning angle,
said predetermined setpoint values corresponding to the angles of inclination that are selected to compensate for a deviation between a distorted field of view and the predetermined setpoint field of view of the emitter device.

2. The emitter device according to claim 1, wherein each setpoint value for the scanning angle is assigned a surface element for reflecting the light beam at the respective setpoint value for the scanning angle.

3. The emitter device according to claim 1, wherein the freeform mirror is mounted in a pivotable fashion and reflects the light beam depending on a pivot angle of the freeform mirror and the angles of inclination of the surface elements at the predetermined setpoint values for the scanning angle.

4. The emitter device according to claim 1, wherein the deflection unit comprises, in addition to the freeform mirror, a pivotable mirror that reflects the light beam emitted onto the pivotable mirror by the light source at actual values for the scanning angle, said actual values corresponding to pivot angles of the pivotable mirror, wherein the freeform mirror is for the purpose of generating the setpoint field of view, to compensate for a deviation between the actual value provided by the pivotable mirror and the setpoint value for the scanning angle.

5. The emitter device according to claim 4, wherein the freeform mirror is arranged in a non-movable fashion in an optical path between the pivotable mirror and the surrounding region and is designed to reflect the light beam reflected onto the freeform mirror at the actual values by the pivotable mirror at the predetermined setpoint values for the scanning angle.

6. The emitter device according to claim 4, wherein the pivotable mirror is configured as a micromirror actuator having a plane surface and a surface of the freeform mirror that is formed by the surface elements of the freeform mirror is configured such that the freeform mirror is at least regionally curved.

7. The emitter device according to claim 4, wherein the angles of inclination of the respective surface elements of the freeform mirror are predefined depending on the pivot angles of the pivotable mirror.

8. The emitter device according to claim 7, wherein the pivotable mirror has a characteristic transfer function describing a distortion of an actual field of view generated by the pivotable mirror with respect to the setpoint field of view as a function of the pivot angles of the pivotable mirror, and the angles of inclination of the surface elements of the freeform mirror are determined in such a way that the freeform mirror has an inverse of the characteristic transfer function.

9. The emitter device according to claim 8, wherein the distortion is determined on the basis of a deviation of shapes of planes of the actual field of view and of the setpoint field of view perpendicular to a principal scanning direction of the emitter device.

10. The emitter device according to claim 1, wherein the light source comprises at least two separately drivable emitter elements to provide the setpoint values for the scanning angle.

11. The emitter device according to claim 1, further comprising: a lens element having a freeform surface for transmitting the light beam deflected by the deflection unit into the surrounding region, wherein the lens element compensates for a deviation of an actual value generated by the deflection unit from the setpoint value for the scanning angle.

12. The emitter device according to claim 1, wherein a plane of the setpoint field of view generated by means of setpoint values for the scanning angle perpendicular to a principal scanning direction of the emitter device is configured in a rectangular fashion.

13. An optical detection apparatus for a motor vehicle for monitoring a surrounding region of the motor vehicle, comprising:

an emitter device according to claim 1; and a receiver device that receives a part of the light beam that has been reflected at an object in the surrounding region, wherein the optical detection apparatus is configured to determine a distance between the object and the motor vehicle on the basis of a time duration between the emission of the light beam and the reception of the reflected part of the light beam, wherein the optical detection apparatus is a laser scanner.

14. A motor vehicle comprising at least one optical detection apparatus according to claim 13.

15. A method for generating a setpoint field of view for an emitter device of an optical detection apparatus of a motor vehicle, wherein a light source for emitting the light beam and a deflection unit are provided for the emitter device, the method comprising:

deflecting a light beam emitted onto the deflection unit by the light source at different scanning angles by the deflection unit;

providing a freeform mirror for the deflection unit, wherein the freeform mirror is produced with at least two surface elements having different angles of inclination; and to generate the setpoint field of view of the emitter device, reflecting the light beam at predetermined setpoint values for the scanning angle, said predetermined setpoint values corresponding to the angles of inclination that are selected to compensate for a deviation between a distorted field of view and the predetermined setpoint field of view of the emitter device.

* * * * *